(12) United States Patent
Saitoh

(10) Patent No.: US 6,872,158 B2
(45) Date of Patent: Mar. 29, 2005

(54) SILENT CHAIN TRANSMISSION DEVICE

(75) Inventor: Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 92 days.

(21) Appl. No.: 10/324,635

(22) Filed: Dec. 20, 2002

(65) Prior Publication Data

US 2003/0125146 A1 Jul. 3, 2003

(30) Foreign Application Priority Data

Dec. 28, 2001 (JP) ........................ 2001/402051

(51) Int. Cl.$^7$ ................ F16G 13/04; F16H 55/14; F16H 7/06
(52) U.S. Cl. .............. 474/212; 474/157; 74/461
(58) Field of Search ................. 474/212–217, 474/207, 223, 152, 156, 157; 74/411, 417, 461, 462; 409/11–12, 30; 29/893.3

(56) References Cited

U.S. PATENT DOCUMENTS

| | | | | |
|---|---|---|---|---|
| 2,335,504 | A | * 11/1943 | Gazda | 74/462 |
| 3,316,771 | A | * 5/1967 | Nichols | 474/212 |
| 3,636,792 | A | * 1/1972 | Vigh | 74/411 |
| 4,127,041 | A | * 11/1978 | Imazaike | 74/411 |
| 4,473,301 | A | * 9/1984 | Namyslo | 74/461 |
| 5,098,231 | A | * 3/1992 | Haug | 407/28 |
| 5,236,400 | A | * 8/1993 | Tsuyama | 474/217 |
| 6,186,921 | B1 | * 2/2001 | Kotera | 474/212 |

FOREIGN PATENT DOCUMENTS

| | | | | |
|---|---|---|---|---|
| EP | 1282890 A2 | * 2/2003 | ........... | F16G/13/04 |
| JP | 54-95674 | 12/1952 | | |
| JP | 57-33246 | 7/1982 | | |
| JP | 62-159829 A | * 7/1987 | ................. | 474/212 |
| JP | 08184348 A | 7/1996 | | |
| JP | 2000-234651 | 8/2000 | | |
| JP | 2001-193803 | 7/2001 | | |
| JP | 2001-304358 | 10/2001 | | |
| JP | 2001-304358 A | * 10/2001 | ............. | F16H/7/06 |
| JP | 2003-35342 | 2/2003 | | |

* cited by examiner

Primary Examiner—Marcus Charles
(74) Attorney, Agent, or Firm—Howson and Howson

(57) ABSTRACT

In a transmission having a silent chain meshing with a sprocket, each link plate of the chain includes inside engaging surfaces and outside engaging surfaces having the same shape as that of a tooth profile of a hob cutter for shaping the sprocket teeth. The sprocket, which engages the outside engaging surfaces of the link plates when the chain is seated on the sprocket teeth, includes tooth head portions shaped to avoid contact interference with inwardly curved portions of the link plates. The silent chain transmission device controls the engagement time of the inside engaging surface, and thereby decreases vibration noise and impact noise, and prevents stress concentration and wear loss on the inside engaging surface, the inwardly curved inside portion of the link plate, and the tooth head portion of the sprocket, thereby improving durability, making assembly easier, and improving production accuracy.

8 Claims, 8 Drawing Sheets

A>B, C<D

A>B, C<D

A=B, C=D

SILENT CHAIN TRANSMISSION DEVICE

FIELD OF THE INVENTION

This invention relates to a silent chain transmission device for use as a timing chain transmission in an internal combustion engine such as an automobile engine, or as a power transmitting chain transmission in an industrial machine or the like.

BACKGROUND OF THE INVENTION

Conventional silent chain transmission devices include a silent chain transmission device as shown in Japanese laid-open Patent Publication No. Hei. 8-184348. In that device, inside flank surfaces in each row of the chain, when stretched linearly, take the form of a portion of the tooth shape of a rack cutter capable of cutting the teeth of the sprocket which meshes with the chain. By forming the tooth surfaces of the sprocket using a rack cutter having a sectional shape corresponding to that of the inside flank surfaces in the contiguous link plates when the silent chain is stretched linearly, polygonal motion of the chain is decreased, and noise is thereby reduced.

When the link plates of the silent chain begin to engage with the sprocket, since the inside flank surfaces of the respective link plates enter from a tangential direction in the same manner as the sectional shape of the rack cutter, polygonal motion of the chain is avoided because the chain and sprocket operate in the same manner as a rack and pinion mechanism. However, when a link plate of the silent chain seats on the sprocket while engaging with and wrapping around the sprocket, polygonal motion of the chain occurs as in conventional silent chains. Thus, polygonal motion of the chain cannot be completely avoided in the process of engagement of the silent chain with the sprocket. Therefore, the problems of vibration, noise and tension variation in the silent chain transmission device could not be solved completely.

There was also the problem that the inwardly curved portion contiguous with and connecting the inside flank surfaces of a link plate interfered with the tooth heads of the sprocket, and the problem that the heads of the V-shaped link teeth interfered with the bottoms of the gaps between the sprocket teeth. Consequently, wear, biased wear, missing teeth, and the like, occurred in the inwardly curved portions of the link plates, the tooth head portions of the V-shaped link teeth, and the bottoms of the tooth gaps of the sprocket.

A proposed silent chain transmission device was disclosed in Japanese patent No. 3108417. In that device as shown in FIG. 6, to reduce vibration noise, changes in chain tension due to polygonal motion of the chain, and wear loss in the tooth heads of the link plates and the tooth gap bottoms of the sprocket, an inward curved portion A11c of the link plate A11 is recessed to a position where contact interference with the tooth heads of the sprocket A20, due to the amplitude of the polygonal motion of the chain, is avoided, when the outside engaging surfaces A11b of a link plate A11 are engaged with a sprocket A20 and seated thereon.

In the silent chain transmission device disclosed in the specification of Japanese patent number 3108414, however, as shown in FIG. 7, the inward curved portion of the link plate A11 is recessed and in the form of a portion of a circular bore. Unnatural engagement between the inside engaging surface of the link plate A11 and the tooth gap of the sprocket A20 occurs in the process of advancing engagement of the link plate A11 with the sprocket, and wrapping of the chain around the sprocket, as shown in FIG. 6. The unnatural engagement produces stress concentration, friction, and the like. Thus, sufficient reduction in noise, and durability of the silent chain transmission device were not achieved.

Furthermore, since the inwardly curved portion A11c of the link plate A11 is recessed, its margin is intersected by the opposed, diverging, inside sprocket-engaging surfaces A11a. Consequently, the lengths of the inside sprocket-engaging surfaces A11a are insufficient to ensure a rapid shift from inside engagement to outside engagement. Thus, there were not only the problems of insufficient noise reduction and insufficient durability, but also the problem of insufficient fatigue strength in the silent chain.

In a silent chain, a slight shift exists in the positions of the bores for receiving connecting pins A12, due to vibration during the punching process. Even if the link plate A11 is punched precisely, the respective portions in the link plate A11 do not always exhibit left-to-right symmetry. That is, dimension A and B are different from each other, as are dimensions C and D (A≠B, C≠D) Unlike the link plate shown in FIG. 8(c), where A=B and C=D, the dimensions may be related as shown in FIG. 8(a), where A>B and C<D. Thus, when a number of link plates A11 are collected at random, and arranged in parallel to each other to form a widthwise link row A10a, the inside diverging surfaces of the link row, which correspond to an envelope of the widthwise projections of all the inside diverging surfaces in a row, are spaced by a distance w, which, as shown in FIG. 8(b), is slightly smaller than corresponding distance W in the individual link plates A11. As a result, the engagement between the silent chain A10 and the sprocket A20 became tight, engagement failure occurred, further vibration, noise, and engagement interference were generated at the engaging surfaces of the silent chain A10 and the sprocket A20, and wear resistance was significantly reduced.

Accordingly, an object of this invention is to provide a silent chain transmission device in which the engagement time of the inside engaging surfaces is controlled, so that vibration noise and impact noise are decreased, and stress concentration and wear at the inside engaging surfaces and inside inward curved portions of the link plates, and the tooth head portions of the sprocket, are prevented. Other objects of the invention are to improve the durability of the chain, and to reduce the burden of ensuring accuracy in the production of the chain components and in the assembly of the silent chain.

SUMMARY OF THE INVENTION

The silent chain transmission device according to this invention comprises a sprocket having sprocket teeth, and an elongated chain in mesh with the sprocket. The chain comprises links disposed in succession in the longitudinal direction of the chain, each link being composed of a plurality of link plates, and the link plates of each successive pair of links being interleaved with each other and articulably connected by a connecting pin. Each link has a pair of link teeth with inside engaging surfaces facing each other, and outside engaging surfaces facing away from each other. The inside engaging surfaces begin engagement with the sprocket by contact between the sprocket teeth and the inside engaging surfaces of the link teeth, and seat on the sprocket by contact between the sprocket teeth and the outside engaging surfaces of the link teeth. The inside and outside engaging surfaces of the link plates have the same profile as the profile of the teeth of a hob cutter for shaping the teeth of said sprocket. The inside engaging surfaces of each link plate diverge from each other and are contiguous with an inward curved portion of the link plate. The tooth heads of the sprocket avoid contact interference with the inward curved portions of the link plates.

Preferably, the link plates of each link row are selected at random, and each link row has an inwardly curved portion formed by inwardly curved portions of its component link plates.

In a preferred embodiment, the shortest distance from each tooth head to the inside engaging portion of the link of the chain with which it is engaged is 1% or less of the chain pitch.

In an alternative embodiment, radial slots are cut into the tooth heads.

The shapes of the inside engaging surface and outside engaging surface of the silent chain according to the invention may be the same as the sections of tooth gap forms profiled in a hob cutter, which produces the shapes of tooth surfaces of the sprocket, and may take any one of several tooth gap forms including linear tooth gap forms, curved tooth gap forms, and the like. The hob cutter used in the invention adopts linear tooth gap forms, which can produce involute tooth gap forms in the sprocket. Alternatively, special curved tooth gap forms according to the tooth gap forms of a sprocket can be adopted.

It is preferable that the inward curved portion be composed of a circular arc, as this can uniformly distribute stress concentration on the inward curved portion when power transmission is carried out in a silent chain transmission device.

The term "chain pitch" as used herein refers to the distance between the centers of a pair of connecting pins inserted through a link plate, or the distance between the centers of a pair of connecting pin holes punched through the link plate.

After the inside engaging surfaces of the link plates begin to engage with a sprocket, the engagement with the sprocket is gradually shifted to the outside engaging surfaces, and the chain becomes seated on the sprocket with the outside engaging surfaces in engagement with the sprocket teeth, whereby power is transmitted to the sprocket.

Specifically, the link plate of the silent chain has the same shape in its inside engaging surfaces as the sections of tooth gap forms profiled in a hob cutter, which produces the shapes of the tooth surfaces of the sprocket. Thus, the inside engaging surface of a link plate moving tangentially toward the sprocket is received by the sprocket without moving up and down relative to the chain traveling line of the sprocket, and smooth engagement with the sprocket teeth is started. After sufficient engagement time between the inside engaging surface and a sprocket tooth, the engagement of a link plate with the sprocket is gradually shifted to engagement of the outside engaging surface with the sprocket teeth.

The sprocket teeth have tooth head portions that avoid contact interference with an inward curved portion contiguously with diverging inside engaging surfaces of the link plates, opposite to each other. Accordingly, since the outside shape of the tooth head becomes smaller than that of the sprocket when tooth-cut by a hob cutter having the same pitch as the chain pitch, when the silent chain engages with the outer periphery of the sprocket and is seated thereon while performing polygonal motion, it does not interfere with the tooth head portion of the sprocket. It engages with the sprocket, and travels regularly and smoothly on the chain traveling line of the sprocket.

DETAILED DESCRIPTION OF THE PREFERRED EMBODIMENTS

Preferred embodiments of a silent chain transmission device according to the invention will be described below with reference to drawings.

Figure 1:
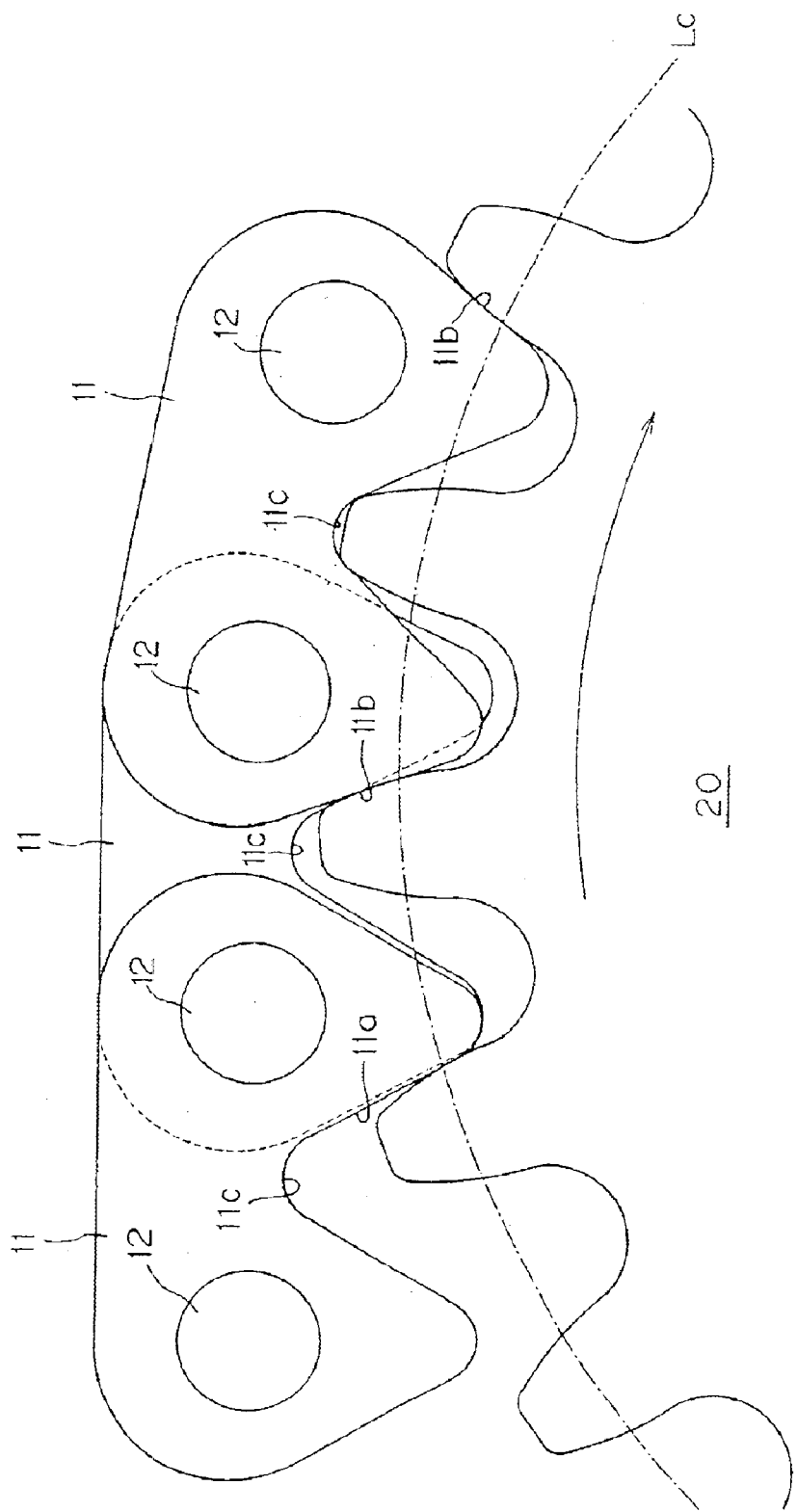
FIG. 1 is a fragmentary side elevational view showing a silent chain of an embodiment of the invention meshing with a sprocket.

As shown in FIG. 1, the silent chain transmission device in accordance with a first embodiment of the invention, comprises a chain composed of link plates 11, arranged in rows widthwise of the longitudinal direction of the chain, the link plates of each row being interleaved with those of each adjacent row and the adjacent rows being connected to one another by connecting pins 12. The chain meshes with a sprocket 20. In the process of meshing of the chain with the sprocket, at the beginning of engagement, inside engaging surfaces 11a engage with the sprocket teeth, but when the links of the chain become fully engaged with the sprocket 20 the outside engaging surfaces 11b of link plates 11 become engaged with the sprocket teeth.

Figure 2:
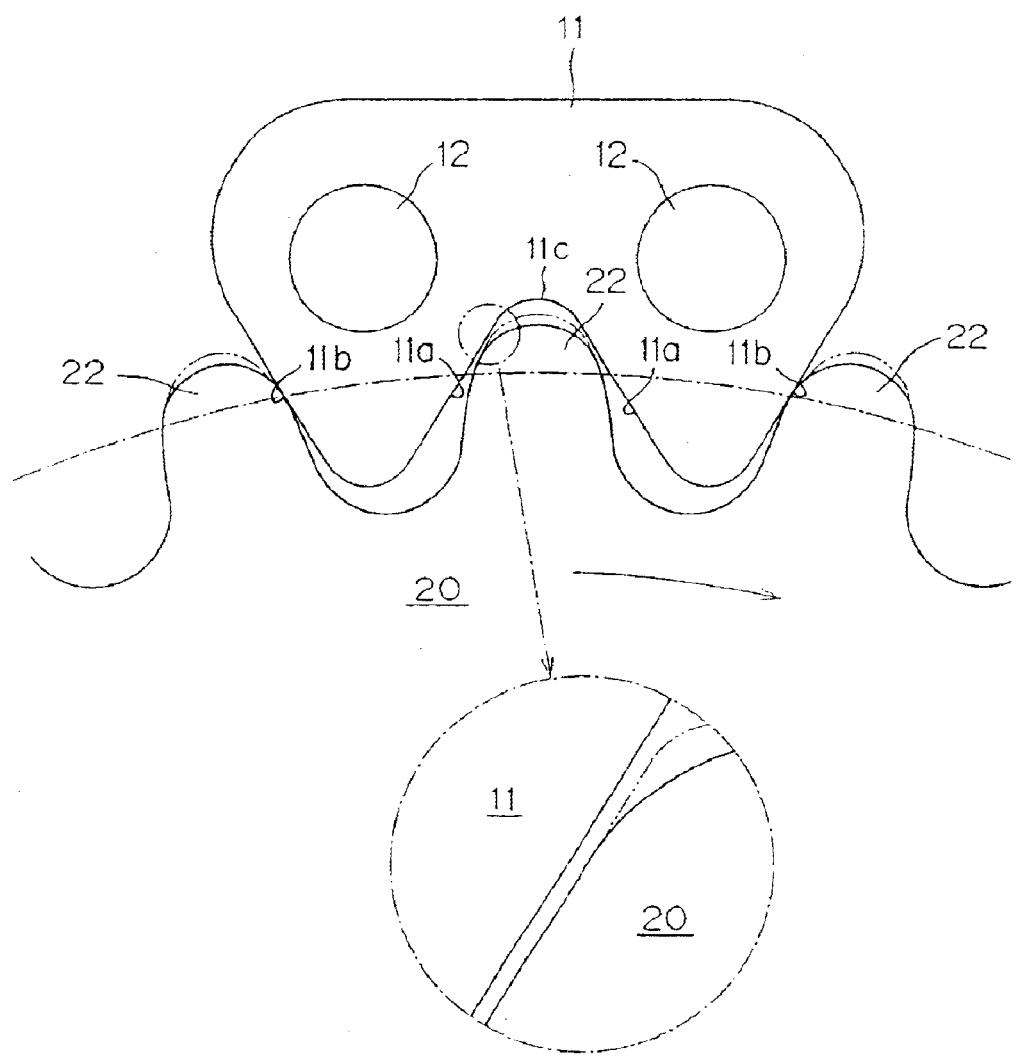
FIG. 2 is an elevational view illustrating the seating of a link plate on a sprocket.
Figure 8A:
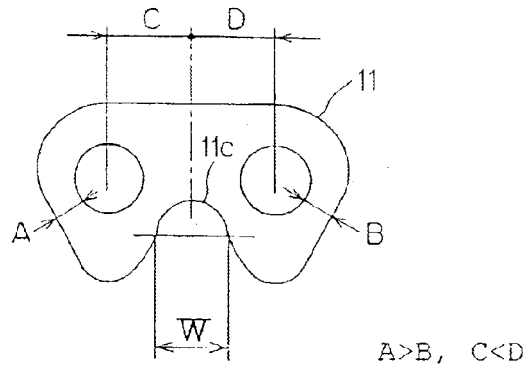
FIG. 8(a) is a view illustrating a conventional link plate having left-to-right asymmetry in the positions of its pin holes, and also showing a dimension of its inside, diverging, sprocket-engaging, surfaces.
Figure 8B:
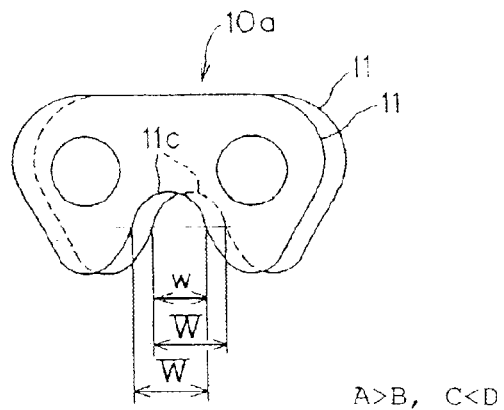
FIG. 8(b) is a view illustrating a link row composed of plural link plates of the kind shown in FIG. 8(a), and showing the dimensional relationship between the inside, diverging, sprocket-engaging surfaces of the link, and the corresponding surfaces of its individual component link plates.
Figure 8C:
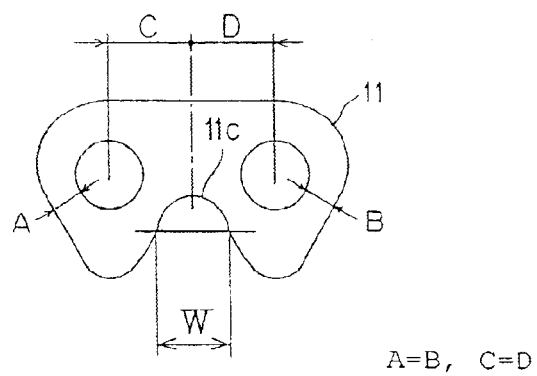
FIG. 8(c) is a view illustrating an ideal link plate having left-to-right symmetry.

An inwardly curved portion 11c is formed on each link plate 11 contiguously with the opposite inside engagement surfaces 11a, which diverge toward the sprocket 20 as shown in FIGS. 1 and 2. When the silent chain is formed of link rows, each consisting of a number of link plates 11 arranged at random and in parallel in the width direction of the chain, the corresponding inward curved portions of each link row are of a size narrower than the size of the inward curved portions 11c of the individual link plates for the reasons discussed above with reference to FIG. 8(b).

Figure 4:
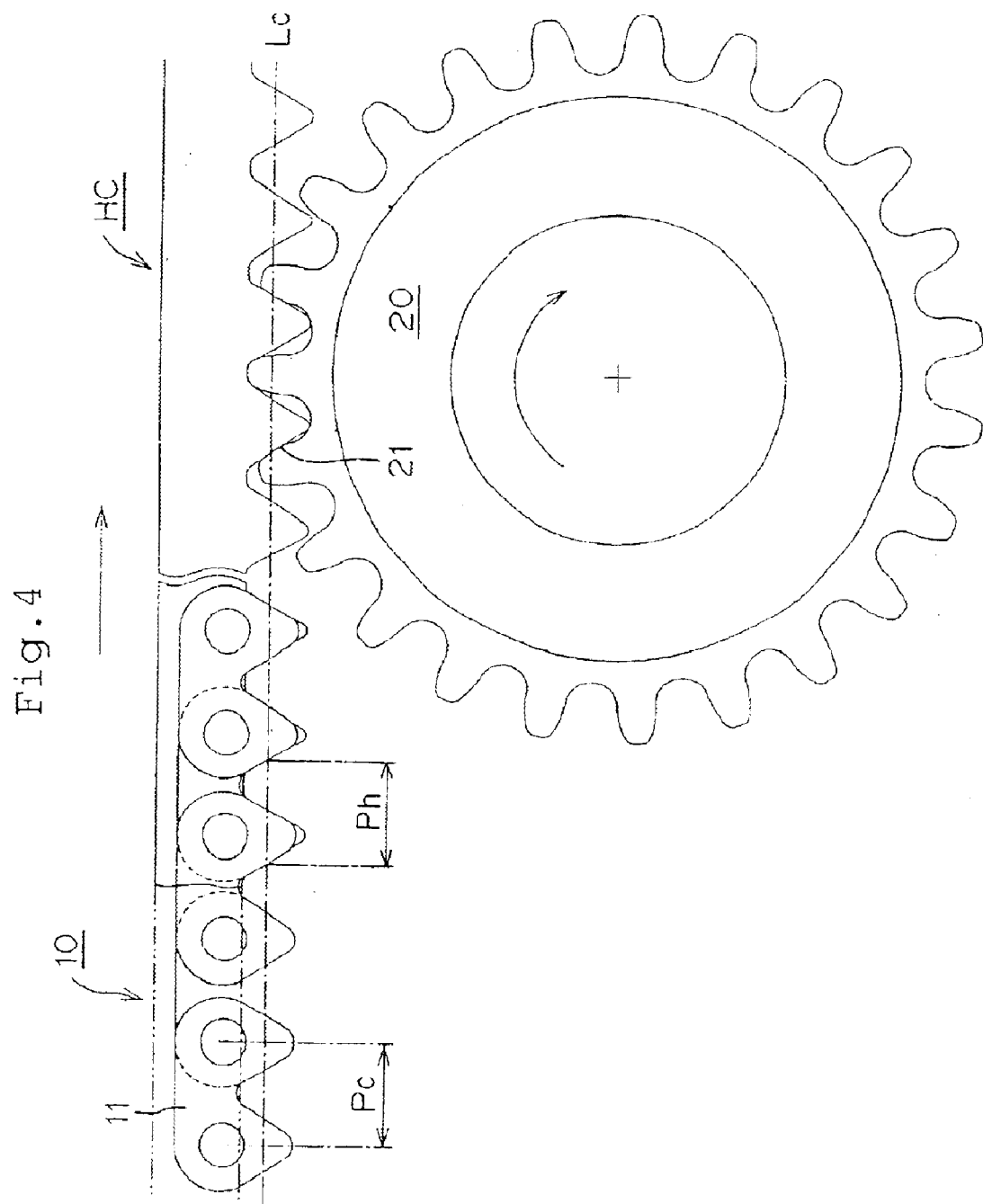
FIG. 4 is a schematic view illustrating the relationship between the sprocket teeth, the hob cutter for forming the sprocket teeth, and the teeth of the silent chain.

The inside engaging surfaces 11a and the outside engaging surfaces 11b of the link plates 11 have the same form as the sections of the tooth gap forms in the hob axis direction of a hob cutter for producing sprocket teeth 21, which will be described later. That is, as shown in FIG. 4, the chain pitch Pc of the silent chain 10 is set to be the same as the hob pitch Ph of the hob cutter HC, which produces sprocket teeth 21.

The term "chain pitch," used with reference to the present embodiment of the invention means the distance between the centers of a pair of connecting pins 12 inserted through a link plate 11.

The sprocket 20 is produced by a tooth cutting process using the hob cutter HC, and includes sprocket teeth 21 having involute tooth gap forms, which engage with the inside engaging surfaces 11a and the outside engaging surfaces 11b of the silent chain 10, and tooth head portions 22, which avoid contact interference with the inward curved portions 11c of the link plates 11 when the outside engaging surfaces 11b are engaged with, and seated on, the sprocket teeth 21 on the chain traveling line Lc of the sprocket.

Figure 3A:
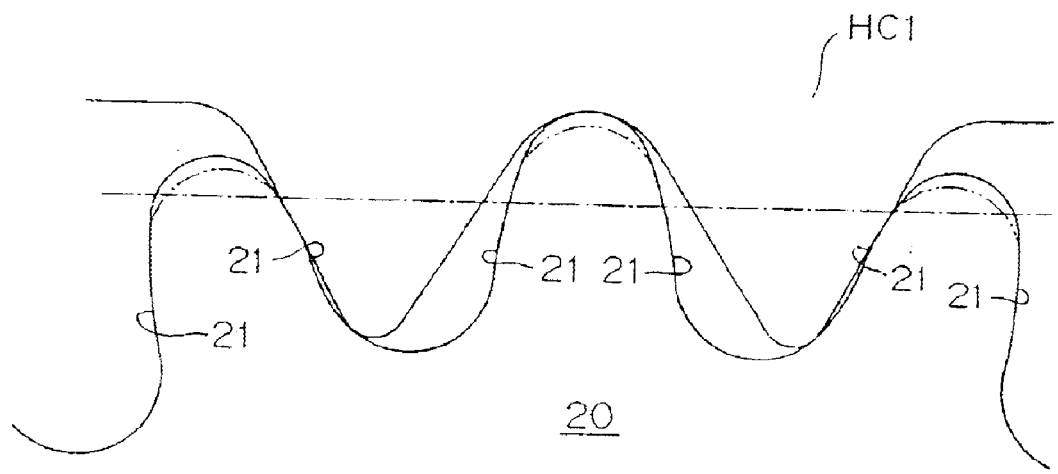
FIGS. 3(a) and 3(b) are schematic diagrams illustrating the cutting of the teeth of a sprocket used in the invention.
Figure 3B:
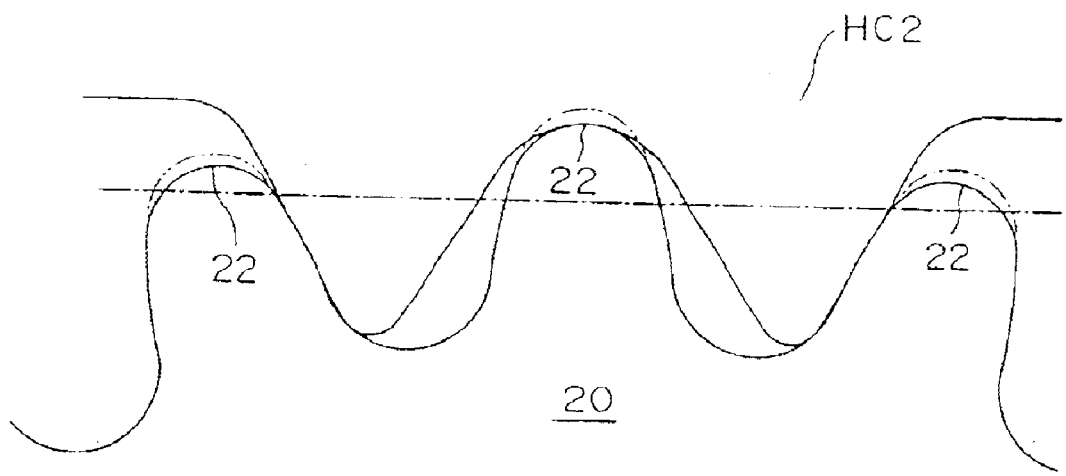

The tooth cutting of the sprocket 20 is illustrated in FIGS. 3(a) and 3(b). Sprocket teeth 21 are first produced, as shown in FIG. 3(a), by a primary tooth cutting operation, using a hob cutter HC1 for a large tooth head, having a hob pitch Ph the same as the chain pitch Pc of the silent chain 10. Then, as shown in FIG. 3(b), tooth head portions 22 are produced by a secondary tooth cutting operation, using a hob cutter HC2 for a small tooth head, having a hob bottom shallower than that of hob cutter HC1. In this case, the relationship between the chain pitch Pc and the hob pitch Ph is the same as shown in FIG. 4.

Thus, in this embodiment, the distance from the tooth head portion 22 of the sprocket 20 to the inside engaging surface 11a of the link plate 11 can be determined by selecting the degree of tooth cutting. Nevertheless, it is desirable that the shortest such distance be 1% or less of the chain pitch Pc.

When the shortest distance from the tooth head portion of the sprocket to the inside engaging surface is maintained at 1% or less of the chain pitch Pc, the silent chain 10 can travel regularly and smoothly on the chain traveling line Lc of the sprocket 20, so that power transmission with low noise and low vibration can be realized. Accordingly, the engagement time for the inside engaging surface 11a, that is the interval from inside engagement to outside engagement, may be optionally selected by taking into account the natural frequency of the engine, and the resonance with the engine can be prevented. However, when the shortest distance from the tooth head portion of the sprocket to the inside engaging surface exceeds 1% of the chain pitch Pc, even if transmission with low noise and low vibration can be realized, disadvantages such as engagement failure, tooth jumping and the like cannot be avoided.

Figure 5:
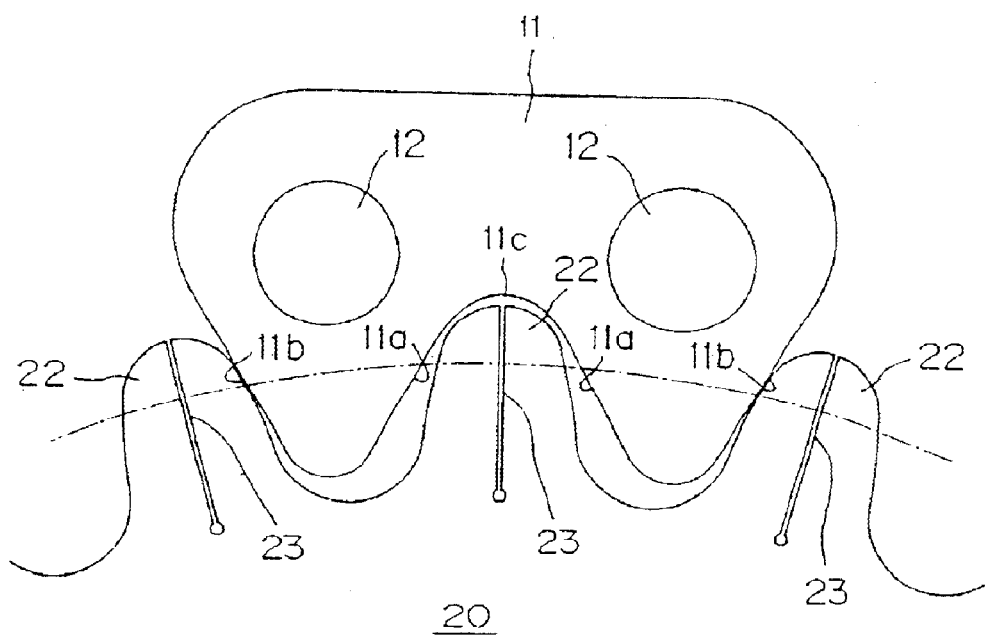
FIG. 5 is an enlarged view, corresponding to FIG. 2, illustrating another embodiment of the invention.
Figure 6:
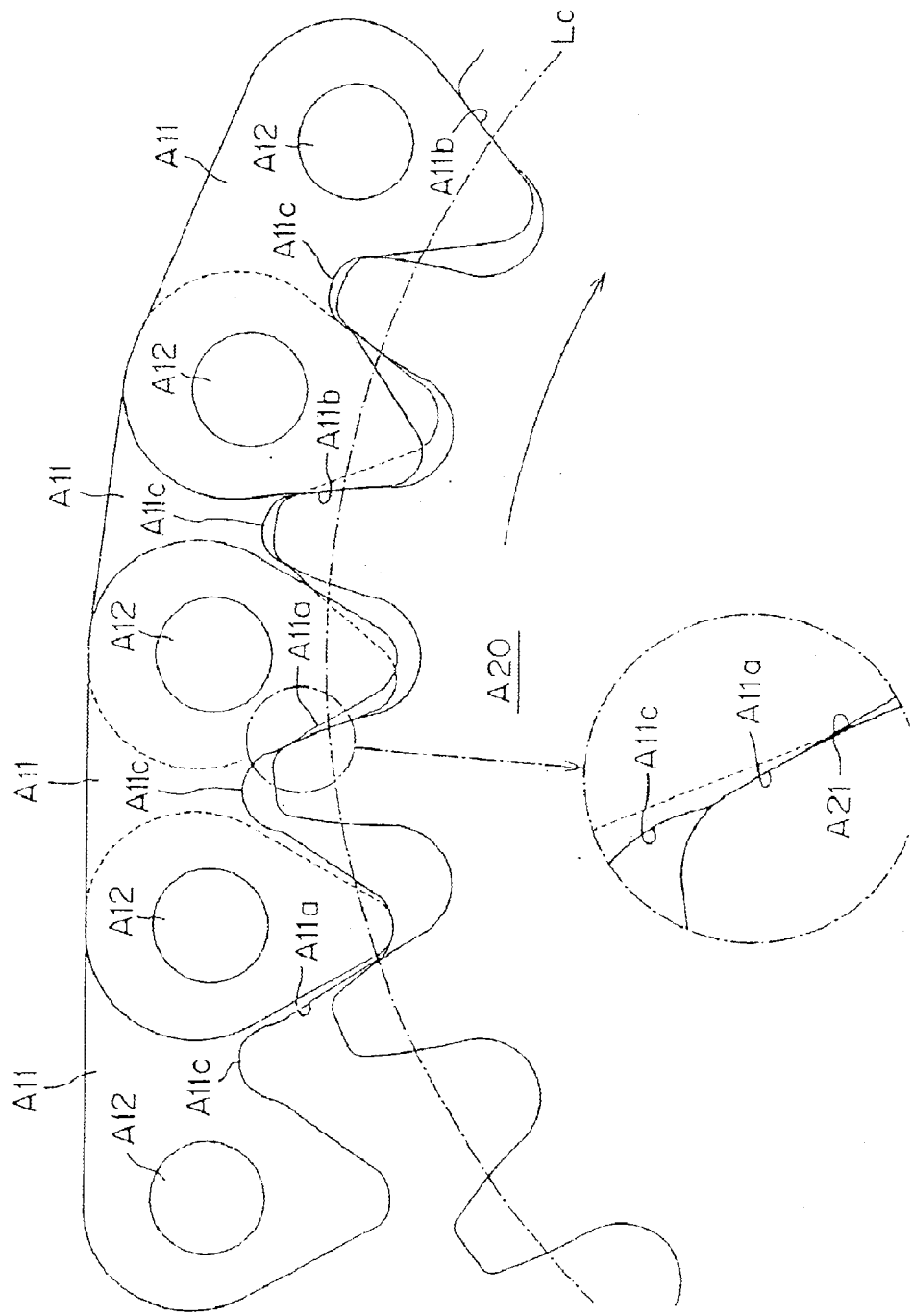
FIG. 6 is a fragmentary side elevational view showing a conventional silent chain transmission device.

As shown in FIG. 5, when a slot 23 is cut in each sprocket tooth, extending radially from the tooth head portion 22 toward the sprocket shaft, engagement impact of the silent chain with the sprocket is absorbed, and at the same time, lubricating oil is stored within the slots 23 so that oil starvation is prevented. In this way, the durability of the silent chain transmission device can be significantly improved.

In the silent chain transmission device of the invention, the inside engaging surface 11a of the link plate, moving tangentially toward the sprocket 20 is received by the sprocket without moving up and down relative to the chain traveling line Lc, so that smooth engagement with the sprocket teeth 21 is started, as show in FIG. 4. Then, as shown in FIG. 1, after sufficient engagement time between inside engaging surface 11a and a sprocket tooth, the engagement of the link plate with the sprocket is gradually shifted from the engagement of the inside engaging surfaces 11a with the sprocket to engagement of the outside engaging surface 11b with the sprocket. Thus, the silent chain 10 becomes seated on the sprocket with the outside engaging surfaces 11b in engagement with the sprocket teeth so that power can be transmitted. Accordingly, noise due to traveling vibration of the chain 10, when looped between sprockets, and impact noise on the sprockets can be reduced. Stress concentrations at the inside engaging surfaces 11a, at the inwardly curved portions 11c, and at the sprocket tooth head portions 22, are removed, and wear losses such as biased wear, missing teeth, and the like, can be prevented, and excellent durability of the link plates can be obtained.

Figure 7:
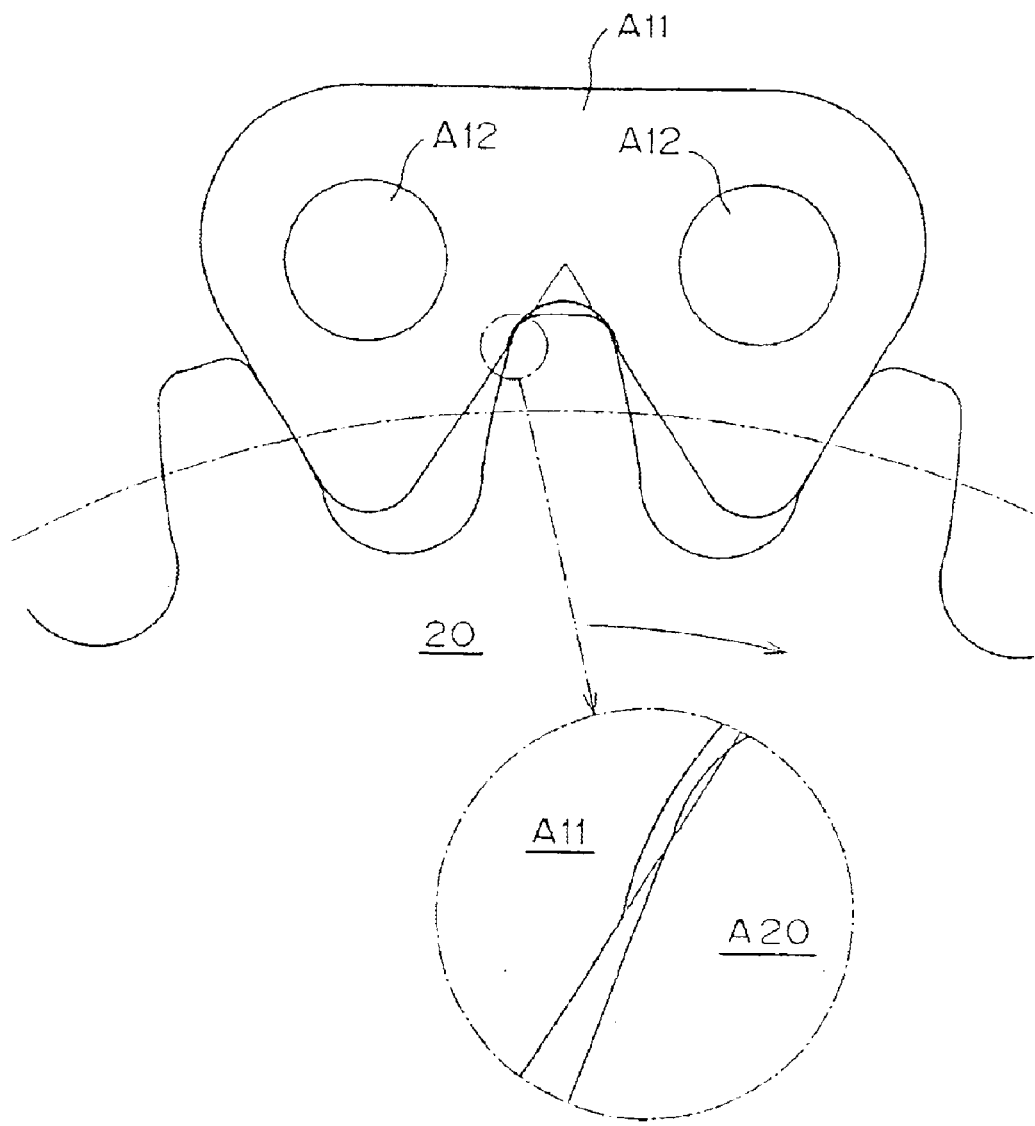
FIG. 7 is an elevational view illustrating the seating of a link plate on a sprocket in a conventional silent chain transmission.

The tooth head portions 22 of sprocket 20 avoid contact interference with the inwardly curved portion 11c of the link plate 11. Thus, even if the inside dimension w (see FIG. 7(b)) of the link rows is decreased by selecting the link plates 11 at random during assembly, disadvantages of the conventional silent chain, such as engagement failure, tooth jumping and the like, do not occur, the burden of assembly of the silent chain and the burden of achieving adequate production accuracy are decreased, and productivity is significantly enhanced.

When the shortest distance from the tooth head portion 22 of the sprocket 20 to the inside engaging surface 11a of the link plate 11 is 1% or less of the chain pitch Pc, disadvantages such as engagement failure, tooth jumping and the like, which occurred in conventional silent chains, are avoided, and the chain travels smoothly and regularly on the chain traveling line of the sprocket, so that whereby transmission with low noise and low vibration can be realized. At the same time, the engagement time from inside engagement to outside engagement can be chosen according to the natural frequency of the engine with which the silent chain transmission is used, and the resonance can be prevented.

With the silent chain transmission device according to the invention, after the chain begins to engage with a sprocket by engagement of an inside engaging surface of a link of the chain with a sprocket tooth, engagement is gradually shifted to the outside engaging surface, and the chain becomes seating with the outside engaging surfaces of the links in engagement with the sprocket teeth, whereby power is transmitted to the sprocket. As a result the following specific effects can be obtained.

First, the link plates have the same shape at their inside engaging surfaces as the sections of the tooth gap profiles of a hob cutter which produces the shapes of tooth surfaces of the sprocket. Thus, the inside engaging surfaces of the link plates, when moving tangentially toward the sprocket, are received by the sprocket without moving up and down relative to the chain traveling line of the sprocket, and stable, smooth engagement with the sprocket teeth is started. After sufficient engagement time for the inside engaging surfaces, the engagement of the link plate with the sprocket is gradually shifted from engagement of the inside engaging surfaces with the sprocket to engagement of the outside engaging surfaces with the sprocket.

The sprocket, which engages the outside engaging surface of the link plate on the chain traveling line of the sprocket teeth when the chain is seated thereon, includes tooth head portions that avoid contact interference with the inwardly curved portions contiguous with the opposed, diverging, inside engaging surfaces of the link plates. Accordingly, since the outsides of the tooth head portions are smaller than those of a sprocket formed using a hob cutter having the same pitch as the chain pitch, when the silent chain engages the outer periphery of the sprocket and is seated thereon while exhibiting polygonal motion, contact interference with the tooth head portions of the sprocket can be avoided. Accordingly, stress concentrations at the inside engaging surface 11a, and the inwardly curved portion 11c of the link plates 11, and the tooth head portions 22 of the sprocket 20, are avoided, and wear losses such as biased wear, missing teeth, and the like, can be prevented, and excellent durability of the link plate can be achieved.

The inwardly curved portions of the silent chain are formed in link rows in which a number of link plates, selected at random, are arranged in parallel in the chain width direction. Thus, the inside dimensions of the link rows are narrowed, and disadvantages such as engagement failure, tooth jumping and the like, which were found in conventional silent chains, could be generated. However, in accordance with the invention, the sprocket includes tooth head portions which avoid contact interference with the inwardly curved portions of the link plate. Therefore, these disadvantages, such as engagement failure, tooth jumping and the like, can be avoided by selection of an appropriate shape for the tooth head of the sprocket. Thus, link rows of link plates can be easily collected and arranged in parallel with each other, and incorporated into a silent chain. The burden of assembly of the silent chain 10, and the burden of achieving adequate production accuracy, are decreased and productivity can be significantly enhanced.

The shortest distance from the tooth head portion to the inside engaging portion is 1% or less of the chain pitch. Accordingly, disadvantages such as engagement failure, tooth jumping and the like, which occurred in conventional silent chains, are avoided, and the silent chain travels regularly and smoothly on the chain traveling line of the sprocket, whereby transmission with low noise and low vibration can be realized, and the time from inside engagement to outside engagement can be optionally selected according to the natural frequency of an engine to prevent resonance.

Slots may be cut into the sprocket teeth in the radial direction, from the tooth head portions toward the axis of rotation of the sprocket. With the incorporation of these slots, engagement impact applied by the silent chain to the sprocket is absorbed, and lubricating oil is stored within the slots, so that oil starvation can be prevented. Thus, the durability of the silent chain transmission device can be further improved to a significant degree.

I claim:

1. A silent chain transmission device comprising a sprocket having sprocket teeth, and an elongated chain in mesh with said sprocket, said chain comprising links disposed in succession in the longitudinal direction of the chain, each link being composed of a plurality of component link plates, and the link plates of each successive pair of links being interleaved with each other and articulably connected by a connecting pin, each said link having a pair of link teeth with inside engaging surfaces facing each other, and outside engaging surfaces facing away from each other, the inside engaging surfaces beginning engagement with the sprocket by contact between the sprocket teeth and the inside engaging surfaces of the link teeth, and seating on the sprocket by contact between the sprocket teeth and the outside engaging surfaces of the link teeth, wherein the link tooth engaging surfaces of said sprocket teeth are shaped by a first hob cutter, the inside and outside engaging surfaces of the link plates have the same profile as the profile of the teeth of said first hob cutter, wherein the pitch of the chain is equal to the pitch of said first hob cutter, wherein each link plate has an inwardly curved portion, wherein the inside engaging surfaces of each link plate diverge from each other and are contiguous with said inwardly curved portion of the link plate, and wherein said sprocket has tooth heads shaped by a secondary hob cutter having a hob bottom shallower than that of the first hob cutter, whereby the tooth heads of the sprocket are smaller than tooth heads formed by said first hob cutter, and thereby avoid contact interference with said inwardly curved portions of the link plates.

2. A silent chain transmission device according to claim 1, in which the link plates of each link row are selected at random, and each link row has an inwardly curved portion composed of said inwardly curved portions of its component link plates in side-by-side relationship to one another.

3. A silent chain transmission device according to claim 2 in which the shortest distance from said tooth head to said inside engaging surface is 1% or less of the chain pitch.

4. A silent chain transmission device according to claim 3 in which radial slots are cut into said tooth heads.

5. A silent chain transmission device according to claim 2 in which radial slots are cut into said tooth heads.

6. A silent chain transmission device according to claim 1 in which the shortest distance from each tooth head to said inside engaging surface is 1% or less of the chain pitch.

7. A silent chain transmission device according to claim 6 in which radial slots are cut into said tooth heads.

8. A silent chain transmission device according to claim 1 in which radial slots are cut into said tooth heads.

* * * * *